Sept. 29, 1970
C. S. PHILLIPS
3,530,650
FORAGE HARVESTER WITH VARIABLE ATTITUDE CONVEYOR AND SELECTIVELY
ATTACHABLE ROW AND NON-ROW HARVESTERS
Filed Oct. 19, 1967
2 Sheets-Sheet 1
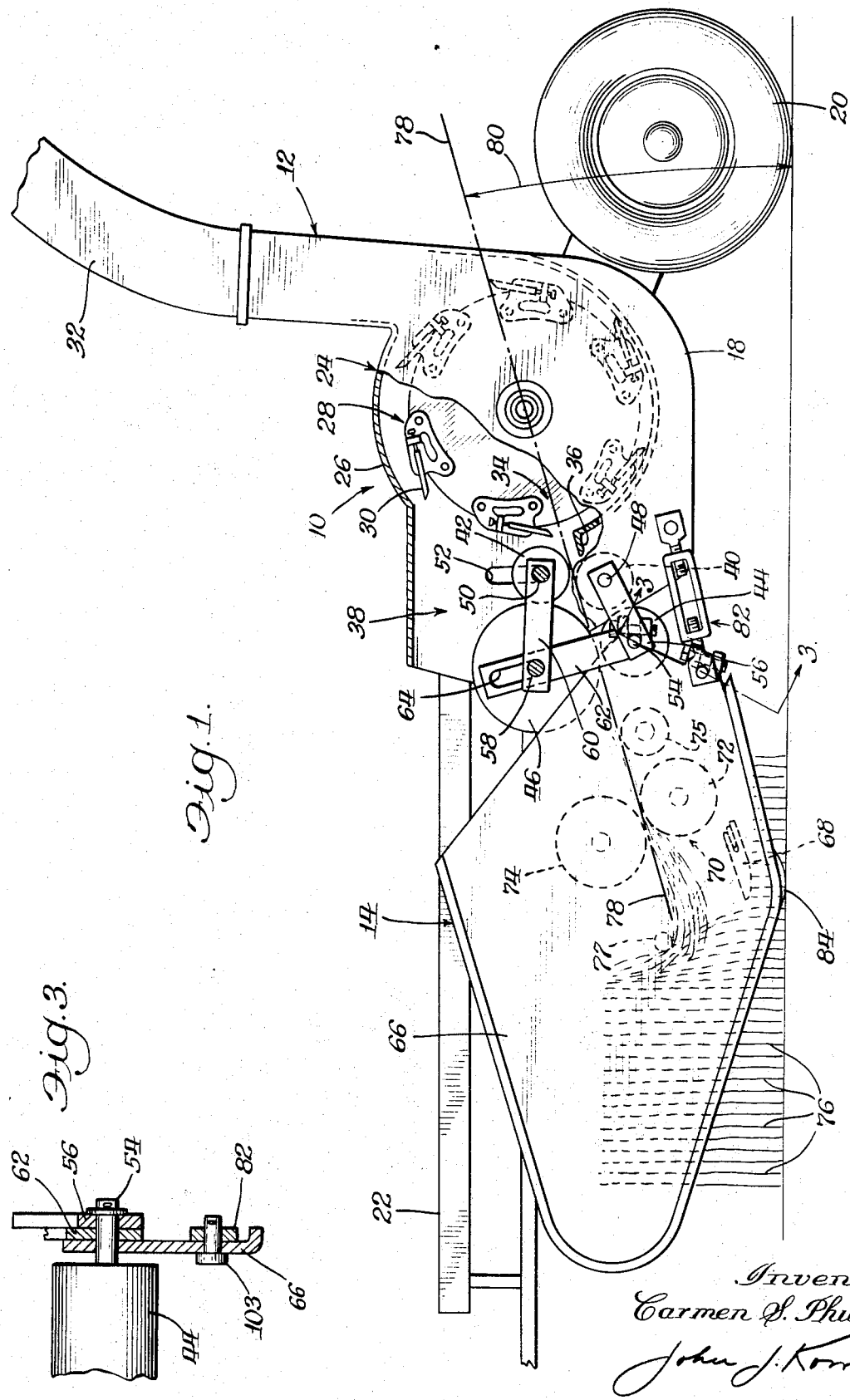
Inventor:
Carmen S. Phillips
John J. Kowalik
Atty

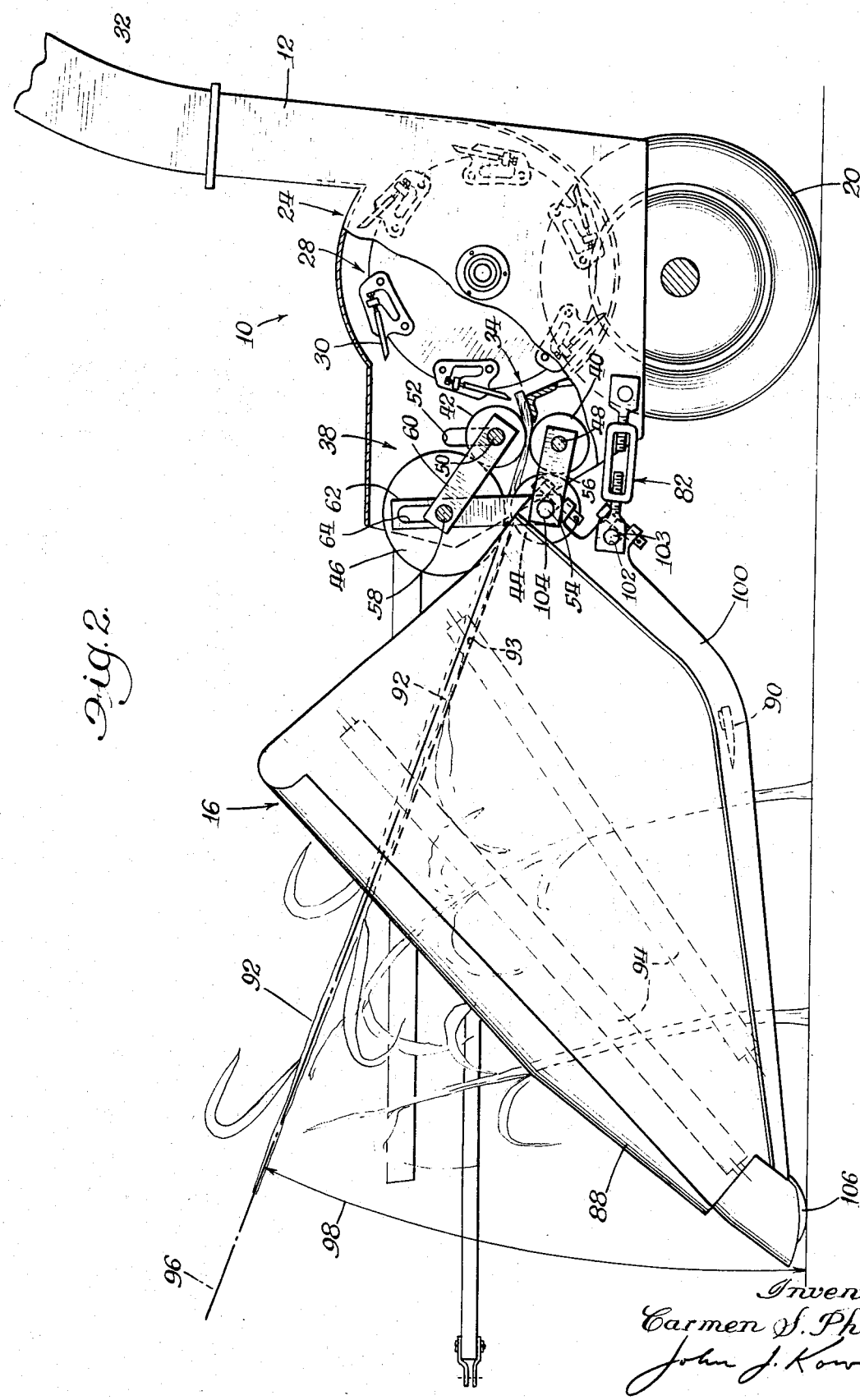

and more particularly a forage harvester with variable attitude conveyor for conveying the plants after being cut to the supplementary processing unit.

United States Patent Office 3,530,650
Patented Sept. 29, 1970

3,530,650
FORAGE HARVESTER WITH VARIABLE ATTITUDE CONVEYOR AND SELECTIVELY ATTACHABLE ROW AND NON-ROW HARVESTERS
Carmen S. Phillips, Downers Grove, Ill., assignor to International Harvester Company, Chicago, Ill., a corporation of Delaware
Filed Oct. 19, 1967, Ser. No. 676,546
Int. Cl. A01d 43/00
U.S. Cl. 56—2
15 Claims

ABSTRACT OF THE DISCLOSURE

A main unit including a processing means, such as a chopper, and a plurality of attachments, one for a row crop and one for a non-row crop for example, the row crop attachment delivering the plants to the processing means in butt-end-down position, and the non-row crop attachment delivering the plants in butt-end-up position. Means are provided for attaching the desired one of the attachments so that it delivers the cut plants to the processing device along a straight line trajectory.

---

The present invention relates to a forage harvester and more particularly a forage harvester with variable attitude conveyor for conveying the plants after being cut to the supplementary processing unit.

The forage harvester of the invention is adapted for selective conversion to a condition for harvesting a non-row crop, and to a condition for harvesting a row crop. The different kinds of crops are carried through the implement, and to the supplementary processing unit, in characteristically different positions. In both cases, the crop plants are so carried butt-end-first, but the non-row crop plants are inclined upwardly rearwardly in being transferred from the cutter to the processing unit, whereas the row crop plants are inclined downwardly rearwardly.

A broad object of the invention is to provide a forage harvester having a conveyor selectively positionable for accommodating the respective positions of the plants as just referred to and continuing the conveying of those plants while generally in that same inclination, to the supplementary processing unit.

A more specific object is to provide a forage harvester and conveying means therein of the character just referred to, wherein the conveying means can be positioned in a low attitude for non-row crops and a high attitude for row crops.

A still more specific object is to provide a forage harvester or implement of the character just referred to, which includes a single main component and an attachment for each of different kinds of crops, and arranged so that when the respective attachment is applied to the main component, the conveying means, carried by the main component, is automatically positioned in the corresponding attitude.

Other objects and advantages of the invention will appear from the following detail description taken in conjunction with the accompanying drawings wherein—

FIG. 1 is a side elevational view of the forage harvester of the invention with the attachment applied thereto for harvesting non-row crops;

FIG. 2 is a view of a harvester similar to FIG. 1 but including the attachment for row crops; and FIG. 3 is a sectional view taken at line 3—3 of FIG. 1.

Referring now in detail to the accompanying drawings the forage harvester of the invention is indicated in its entirety at 10 and includes a main component unit or structure 12 and one of two attachments, one of them, 14, of FIG. 1 being the attachment for harvesting non-row crops such as hay, and the other, 16, of FIG. 2 being the attachment for harvesting row crops such as corn, cane, etc. The main component or unit 12 is the same in both instances while the attachments 14 and 16 are of course different as will be described in detail hereinbelow. The main component or unit 12 may be any of various forms of implements and in the present instance is a cutter or chopper. The implement includes a chassis 18 mounted on wheels 20 and having a tongue 22 for connection to a draft implement such as a tractor. The unit 12 includes a cutter or processing component 24 of known kind, including an outer housing 26 and a rotary cutter or chopper 28 having knives 30 for cutting the plants conveyed into the cutter unit. Upon the plants being thus cut they are blown or thrown through a spout 32 into a suitable receptacle. The housing 26 for example has an opening at 34 for receiving the cut plants, and the unit has a shear plate 36 immediately in front of the opening 34. These elements of the cutter or chopper unit are known.

The unit 12 includes a conveyor means indicated generally at 38 and constituting a principal feature of the invention. This conveyor means is shown in its simplest form, and without the constructional details of the manner of mounting the various elements in the frame or chassis of the implement. The conveyor means includes a rear set of rollers 40, 42 and a front set 44, 46. Rollers 42, 46 constitute the top or upper conveyor assembly and rollers 44, 48 the lower or bottom conveyor assembly. In the case of the rear set, the lower roller 40 has a shaft 48 which is mounted in a fixed position in the frame of the implement. The upper rear roller 42 has a shaft 50 riding in vertical slots 52 in the frame of the machine, being spring loaded for normally positioning it in its lower position at the bottom of the slots. The roller 42 may however rise against the action of the springs in accordance with the quantity of plants passing between the rollers.

The lower roller 44 in the front has a shaft 54 mounted in the forward ends of links 56 which are pivoted on the shaft 48 of the lower rear roller 40. The upper front roller 46 has a shaft 58 journalled in links 60 which are pivoted on the shaft 50 of the upper rear roller 42. Additional links 62 are pivoted at their lower ends on the shaft 54 and at their upper ends have longitudinal slots 64 disposed in upright position, receiving the shaft 58. These elements just referred to are operative for establishing the attitude of the conveyor means in response to securing the respective attachments 15, 16 to the unit 12 as described in detail hereinbelow. These links and shafts in addition to the intervening housing portion between shafts 48 and 50 constitute essentially a parallelogram linkage.

Referring first to the unit 14 of FIG. 1 for non-row crops, this unit includes a pair of side plates 66 (one shown) and positioned at the sides of the implement, which may for example be on the order of six feet apart. Mounted in the unit is a cutter 68 which may be in the form of a sickle which extends across the attachment between the side plates 66. The attachment 14 also includes a suitable pickup means indicated at its entirety at 70 which may be any of various kinds and as here shown includes a lower front roller 72 and an upper roller 74 which may be an auger which in addition to assisting in picking up and conveying the cut plants also conveys or moves them inwardly from the sides toward the center, for conveyance into the cutter unit 24 which normally is much narrower than the attachment 14. Rearwardly of the roller 72 is a feed roller 75 which when the attachment 14 is mounted on the unit 12 is closely adjacent the lower front roller 44. The series of rollers 72, 75, 44, 40 form conveying means on which the cut crop plants bear, the conveying function of course being assisted by the upper rollers 74, 46, 42.

The non-row crop indicated at 76 may for example be hay, and in the cutting of such plants the upper portions are bent forwardly by a "flick bar" 77 incorporated in the attachment, causing the lower ends, after being cut by the sickle 68, to spring rearwardly. They also spring upwardly into an upward and rearward inclination indicated by the line 78 positioned at an angle 80 to the horizontal. It is desired to convey the plants after being so cut to the cutter 24 in substantially that same angle throughout their conveyance and to this end the conveyor means 38 is so positioned or oriented in response to securement to the attachment 14 to the unit 12. The rollers 72 and 75 also are relatively inclined along the line 78.

The attachment 14 is secured to the frame of the unit 12 by adjustable links or straps 82 one for example at each side and connected directly to the side plates 66 preferably through a quick attaching connection, but at a certain postion for establishing the orientation of the conveyor means as stated; the attachment 14 may be provided with skids 84 preferably adjacent to, and which may be part of the construction including, the sickle 68. The skids ride on the ground and, together with the links or straps 82, preposition the attachment 14 for accomplishing the desired orientation of the conveyor means 38. Adjustment of the straps 82 also serves to change the position of the attachment and thus the attitude of the guards on the non-row crop attachment for different crop conditions. It also eliminates the necessity for vertically adjustable axles. The side plates 66 are mounted on the ends of the shaft 54 of the lower front roller and the lower front roller 44 is in a low position, below the lower rear roller 40. This low position of the roller 44 enables the upper front roller 46 to assume a low position through the action of the links 62, the spring loading arrangement on the shaft 58 of course effecting lowering of the upper roller 46. The shaft 54 and straps 82 serve as attachment means to the respective unit 14.

This positioning of the front rollers 44, 46 in such downward position, predisposes the bite between those rollers and the rear rollers 40, 42 along a line, or plane, coinciding with the line 78 and thus in proper position to grasp the plants 76 by the cutter bar upon the plants being cut. The plants after being lifted by the pickup means 70 continue rearwardly over the feed roller 75, then between the front rollers 44, 46 and then in a continuation of the same direction of movement, between the rear rollers 40, 42. This line between the bites of the respective pairs of rollers continues into the opening 34 of the cutter 24 and thus the conveyance of the plants after being cut continues in a direct line as contrasted with implements heretofore known in which the plants after being cut would be shifted into a different position, such as into a horizontal position and then conveyed into the supplementary unit or cutter 24.

The attachment 16 of FIG. 2 for row crops includes side gathering dividers 88 (one shown) one at each side of the attachment. The attachment 16 may be of single row construction, or two row construction, as desired. The attachment includes a cutter 90 of suitable kind which may be a sickle, extending across the passage or passages through which the crop plants pass. As in the case of row crop harvesters, the plants, indicated at 92 due to the characteristic operation of the implement, fall forward to an inclined position, i.e., their upper ends fall forward and they are fed into the implement or supplementary processing unit 24 butt-end-first. The attachment 16 may include gathering chains 94 which carry the crop plants through the attachment and whether such gathering chains are incorporated in the attachment or not, the plants are normally deposited in a rearwardly and downwardly inclined table 93 on the attachment and assume an inclination as stated, which in this instance is indicated by the line 96 indicating an angle 98 with the horizontal. This inclination of the plants is established both by the action of the chains 94 and the accumulation of the plants on the table.

In this case also, the consideration is that the plants after being so cut, in conveying them to the supplementary unit 24, are maintained at the angle they normally assume, i.e., the angle 98, and to accomplish this result the attachment 16, in the securement thereof to the unit 12, prepositions the conveyor means 38 to so convey the plants 92 in the direction indicated with a straight through action as contrasted with prior art devices where the conveyor attitude is fixed and wherein the stalks must be bent upwardly under the upper portion of the conveyor and the plant is then fed in the plane such as indicated at 78 in FIG. 1. For this purpose the attachment 16 is provided with frame elements 100 at the sides having apertures 102 receiving securing means 103 for the front ends of the links 82. These frame elements also have apertures 104 for receiving the shaft 54 of the lower front roller 44. The attachment 16 is provided with skids 106 at the forward ends riding on the ground, and this support together with the position of the apertures 102 and 104, positions the attachment in such a manner that the apertures 104 support the lower front roller 44 in an upper position, and this roller acting through the links 62 correspondingly positions the upper front roller 46 in an upper position. The bite between the front rollers and that between the rear rollers, thus lie in a line or plane coinciding with the line 96 which is the inclination of the cut plants as referred to above, this line of course leading to the opening 34 of the unit 24. The plants after being cut are therefore conveyed into the unit 24 along the line of their inclination, without changing the position of the plants as was done heretofore when the plants were, for example, changed to a horizontal position and then conveyed into the unit 24.

The rear and front rollers are preferably positioned close to each other, the front rollers swinging in arcs concentric with the axes of the rear rollers. The links 62 being pivoted on the shaft 54 accommodate the arcuate movement of the upper roller 46 in its movements between upper and lower positions. The specific character of the roller may be as desired. The shaft 54 and links 82 serve as attachment means to the respective unit 16.

It will be observed that each harvesting and gathering unit 14 or 16 has an optimum crop discharge trajectory namely 78 or 96 and the adjustment of the linkage 82 will align this trajectory for optimum delivery to the basic unit 12.

What is claimed is:

1. In a forage harvester a base unit, crop processing means including conveying means on said base unit, a crop harvesting and gathering unit positioned ahead of said base unit, means on said gathering unit providing a discharge trajectory for crop material therefrom, means pivotally mounting said units to one another on a substantially horizontal axis for relative vertical pivotal movement therebetween, adjustable means displaced vertically with respect to said axis and extending transversely thereof and having spaced pivotal connections to respective ones of said units, said adjustable means being adjustable to vary the spacing of said spaced connections with attendant pivoting of said gathering unit about said axis to align the trajectory of said means on the gathering unit with said conveying means in a position providing optimum delivery of the material thereto.

2. In a harvester, an ambulatory main structure comprising a processing component, means mounted on the main structure for conveying crop material to said component along a predetermined path, means for selectively attaching a plurality of different harvesting units having crop discharge means with different crop discharge trajectories to said main structure in delivery relation to the conveying means, and means for adjustably mounting said conveying means on said main structure with respective ones of said harvesting units in positions aligning said path of conveyance of said conveying means with the trajectory of the respective harvesting unit being connected to the main structure for essentially straight through delivery of the harvested crop material through the conveying means to the processing component.

3. A forage harvester according to claim 2 wherein the conveying means includes relatively fore-and-aft positioned conveyor units each including a pair of relatively superposed forward and rear rollers.

4. A forage harvester according to claim 3 wherein the processing component has a forwardly directed receiving opening, the rear pair of rollers are adjacent said opening, and the forward pair of rollers are swingable vertically.

5. A forage harvester according to claim 4 wherein links are pivoted on the axes of respective ones of the rear rollers, and the front rollers are journalled in the swinging ends of the links.

6. The invention according to claim 2 and said conveying means comprising opposed top and bottom conveyor assemblies and means interconnecting said assemblies and limiting movement of the top assembly toward the bottom assembly.

7. The invention according to claim 6 wherein the bottom assembly is pivoted to said main structure on a fixed generally horizontal axis adjacent to the processing component in delivery relationship thereto, and said means interconnecting the top and bottom assemblies effecting conjunctive vertical swinging movement of the conveyor assemblies.

8. The invention according to claim 7 and said means operatively interconnecting said assemblies being part of a parallelogram linkage.

9. The invention according to claim 2 and said conveying means comprising top and bottom conveying assemblies and said bottom assembly comprising said means providing an attachment for an associated one of said harvesting units on a generally horizontal axis, and said means for selectively attaching said unit having a connection on a generally horizontal axis to the main structure and providing a connection to the associated one of said units on a generally horizontal axis vertically spaced from said first mentioned axis.

10. The invention according to claim 9 and said last-mentioned means being adjustable for varying the distance between the second and third mentioned axes for thereby adjustably tilting the attached unit about the first-mentioned axis.

11. The invention according to claim 2 wherein one of said harvesting units comprises a row crop harvester having a downwardly and rearwardly directed crop delivery trajectory and another of said harvesting units comprises a non-row crop harvester having an upwardly and rearwardly directed trajectory, and said means for selectively attaching said units to the main structure comprising a generally parallelogram linkage.

12. The invention according to claim 2 and said conveying means comprising upper and lower assemblies, and means mounting said upper assembly for movement upwardly away from said lower assembly.

13. A forage harvester comprising a main unit including a processing means having a forwardly directed receiving opening, means on the main unit for selective mounting of a plurality of plant harvesting attachments on the front of the main unit certain of the attachments having means providing a crop delivery upwardly and rearwardly into said receiving opening and other of the attachments having means providing a downwardly and rearwardly directed crop delivery into said receiving opening, conveying means on said main unit including means attachable to respective ones of said attachments for positioning the conveying means in alignment with the crop delivery direction of the respective one of said attachments whereby said main unit will accept transfer of the crops in a direction in alignment with the crop delivery of the respective attachment to which the main unit is attached, and said conveying means including vertically movable front rollers, means on said attachments for connecting the movable rollers to respective ones of said attachments in the mounting thereof on the main unit, whereby to position said movable rollers to align with the delivery direction of the respective attachment.

14. A forage harvester according to claim 6 wherein each one of said attachments is mountable on the main unit selectively in such a manner that its bottom side rides upon the ground while the attachment is secured to the main unit.

15. A forage harvester according to claim 14 and said front rollers comprising upper and lower rollers, and means interconnecting the lower front roller and the upper front roller for positioning the upper front roller according to the position of the lower front roller.

References Cited

UNITED STATES PATENTS

| 2,728,180 | 12/1955 | Whisler | 56—16 X |
| 2,998,834 | 9/1961 | Carlson et al. | |
| 3,139,717 | 7/1964 | Fischer. | |
| 3,397,520 | 8/1968 | Johnston et al. | |

OTHER REFERENCES

New Holland—Advertising Brochure entitled: "Forage Harvester 616," copyright 1961, by New Holland Machine Co., Division of Sperry Rand Corp., New Holland, Pa.

F. BARRY SHAY, Primary Examiner

U.S. Cl. X.R.

56—15, 23